US008531991B2

(12) United States Patent
Sane et al.

(10) Patent No.: US 8,531,991 B2
(45) Date of Patent: Sep. 10, 2013

(54) MULTI-CHASSIS EMULATED SWITCH

(75) Inventors: Sanjay Sane, Fremont, CA (US);
Lawrence Kreeger, Fremont, CA (US);
Thomas Edsall, Cupertino, CA (US);
Elango Ganesan, Palo Alto, CA (US);
Soei-Shin Hang, Saratoga, CA (US);
Ramana Mellacheruvu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1090 days.

(21) Appl. No.: 11/582,194

(22) Filed: Oct. 16, 2006

(65) Prior Publication Data

US 2008/0089247 A1      Apr. 17, 2008

(51) Int. Cl.
*H04L 12/28* (2006.01)
*H04L 12/413* (2006.01)
*G01R 31/08* (2006.01)

(52) U.S. Cl.
USPC ........... 370/256; 370/238; 370/389; 370/392; 370/408

(58) Field of Classification Search
USPC ............... 370/255, 256, 408, 409, 238, 238.1
See application file for complete search history.

(56) References Cited

U.S. PATENT DOCUMENTS

| | | | | |
|---|---|---|---|---|
| 5,742,604 A | * | 4/1998 | Edsall et al. | 370/401 |
| 5,949,788 A | * | 9/1999 | Friedman et al. | 370/431 |
| 6,195,351 B1 | * | 2/2001 | Hiscock et al. | 370/389 |
| 2003/0016624 A1 | * | 1/2003 | Bare | 370/217 |
| 2005/0220014 A1 | * | 10/2005 | DelRegno et al. | 370/230 |
| 2006/0098589 A1 | | 5/2006 | Kreeger et al. | 370/256 |
| 2006/0126616 A1 | | 6/2006 | Bhatia | 370/389 |
| 2007/0025252 A1 | * | 2/2007 | McGee et al. | 370/235 |
| 2008/0025217 A1 | * | 1/2008 | Gusat et al. | 370/232 |
| 2008/0089247 A1 | * | 4/2008 | Sane et al. | 370/256 |

OTHER PUBLICATIONS

"What is HSRP?—A Word Definition From the Webopedia Computer Dictionary", www.webopedia.com, downloaded Oct. 13, 2006.
Notification of Transmittal of the International Search Report of the International Searching Authority mailed Apr. 10, 2008, 3 pages.
Written Opinion International of the Searching Authority mailed Apr. 10, 2008, 5 pages.
CN Office Action dated Apr. 25, 2011 from Chinese Patent Appl. No. 200780034817.9.

\* cited by examiner

*Primary Examiner* — Faruk Hamza
*Assistant Examiner* — Thinh Tran
(74) *Attorney, Agent, or Firm* — Weaver Austin Villeneuve & Sampson LLP

(57) ABSTRACT

A solution is provided wherein the interfaces between multiple chassis (e.g., edge switches) in a network of layer 2 devices and a spanning tree device are treated as a single emulated switch. This emulated switch effectively enables two different views to the two different sides. Thus, frames from the network of layer 2 switches destined to any port of the emulated switch may take any of the links (through any of the physical switches), thereby enabling effective load-balancing for frames traveling from the layer 2 network side into the spanning tree device. Meanwhile the spanning tree device does not recognize an illegal loop in its connection to two different edge switches as it views the two links as a single logical EtherChannel.

21 Claims, 12 Drawing Sheets

MULTI-CHASSIS EMULATED SWITCH

BACKGROUND OF THE INVENTION

1. Technical Field

The present invention relates to computer networking.

2. Description of the Related Art

Data management within organizations is an ever increasing concern, especially with the rise of the Internet information age. The heart of this data management function is sometimes known as a data center. Over the last decade, data centers have evolved into the strategic focus of Information Technology (IT) efforts to protect, optimize, and grow the organization.

Data center managers face several challenges in fulfilling these goals. Most enterprise data centers grew rapidly to meet the explosive economic growth of recent times. Consequently, applications commonly stand alone in underutilized, isolated infrastructure silos. Each infrastructure silo is designed based on the inclination of the specific application being deployed, so that a typical data center supports a broad I assortment of operating systems, computing platforms, and storage systems. The disparate infrastructures supporting different application "islands" are difficult to change or expand and expensive to manage, integrate, secure, and back up. FIG. 1 illustrates this type of "isolated application" environment.

One solution to this problem is to design a data center environment that is highly scalable, resilient, secure, and able to integrate multiple applications and protocols. One such solution is known as the Data Center Network Architecture. A specific implementation of the Data Center Network Architecture is known as Data Center Ethernet (DCE). DCE allows for consolidation of input and output, and improved forwarding of communications within the network. This may be accomplished via specialized protocols and functionality operated by switches within a DCE network via network layer 2. Each of the switches within the DCE network may be a layer 2 device. FIG. 2 illustrates a DCE network. Edge switch 200 may be connected to a server 202. Edge switch 204 may be connected to server 206. Edge switches 200, 204 may then be connected to several core switches 208, 210, which then may be connected to other edge switches 212, 214. Each DCE switch may be assigned a unique identifier. A routing protocol, such as Intermediate-System-to-Intermediate-system (IS-IS), may be used inside DCE. Switches using this routing protocol may append information to frames sent though the DCE. This appended information may be in the form of a MAC-in-MAC header attached to the frame. Edge switches 212, 214 may then each be connected to non-DCE devices, such as Classic Ethernet (CE) switches 216. CE switches do not run the forwarding protocols supported by DCE, and do not append the MAC-in-MAC information. They run a variant of the Spanning Tree protocol. They are connected to the DCE network.

Rather than forwarding frames to MAC addresses, DCE switches send frames to edge switches based on the edge switch identification via the MAC-in-MAC header. The edge switch then knows which of its ports to send the frame out to arrive at the correct MAC address (for example, the port connected to switch 216), and strips off the MAC-in-MAC header prior to doing so.

The network design depicted in FIG. 2, however, encounters a problem during actual operation. Specifically, when two links originate from the same CE switch 216 to different DCE switches 212, 214, the spanning tree protocols operated by CE switches recognize this as a spanning tree loop. The remedy for such a loop is to activate only one link at a time. This, however, eliminates the possibility of load sharing and providing redundancy across 2 (or more) DCE chassis.

DESCRIPTION OF EXAMPLE EMBODIMENTS

Overview

A solution is provided wherein the interfaces between multiple chassis (e.g., edge switches) in a network of layer 2 devices and a spanning tree device are treated as a single emulated switch. This emulated switch effectively enables two different views to the two different sides. Thus, frames from the network of layer 2 switches destined to any port of the emulated switch may take any of the links (through any of the physical switches), thereby enabling effective load-balancing for frames traveling from the layer 2 network side into the spanning tree device. Meanwhile the spanning tree device does not recognize an illegal loop in its connection to two different edge switches as it views the two links as a single logical EtherChannel.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

Figure 1:
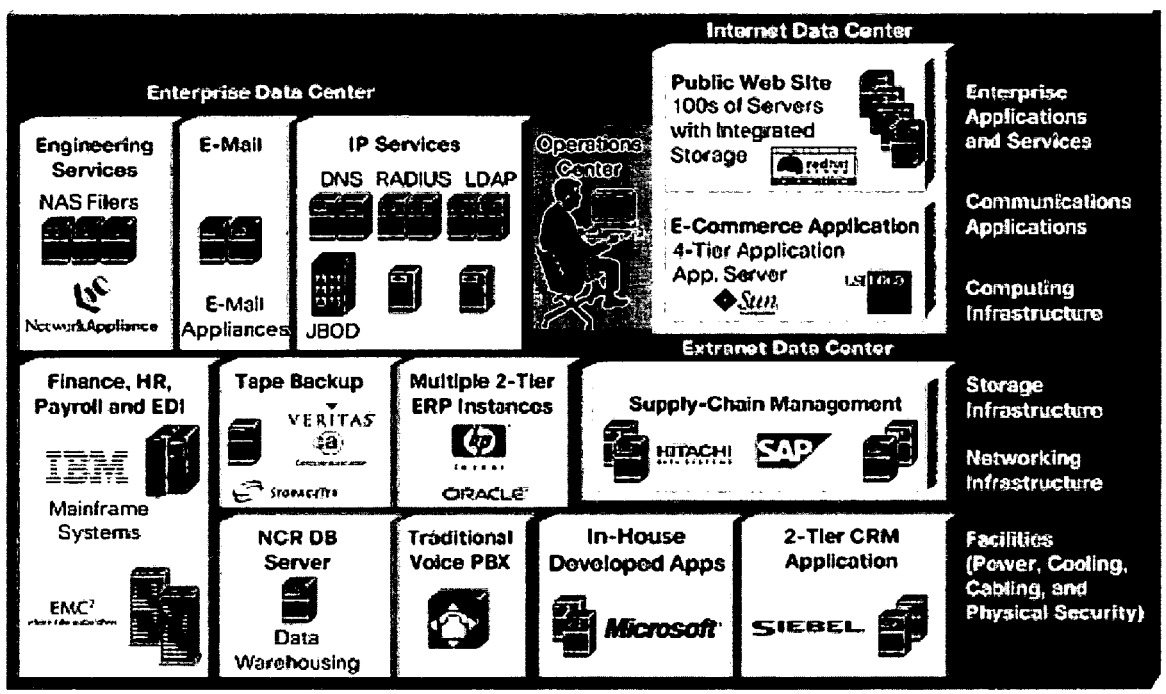
FIG. 1 illustrates a typical "isolated application" environment.
Figure 2:
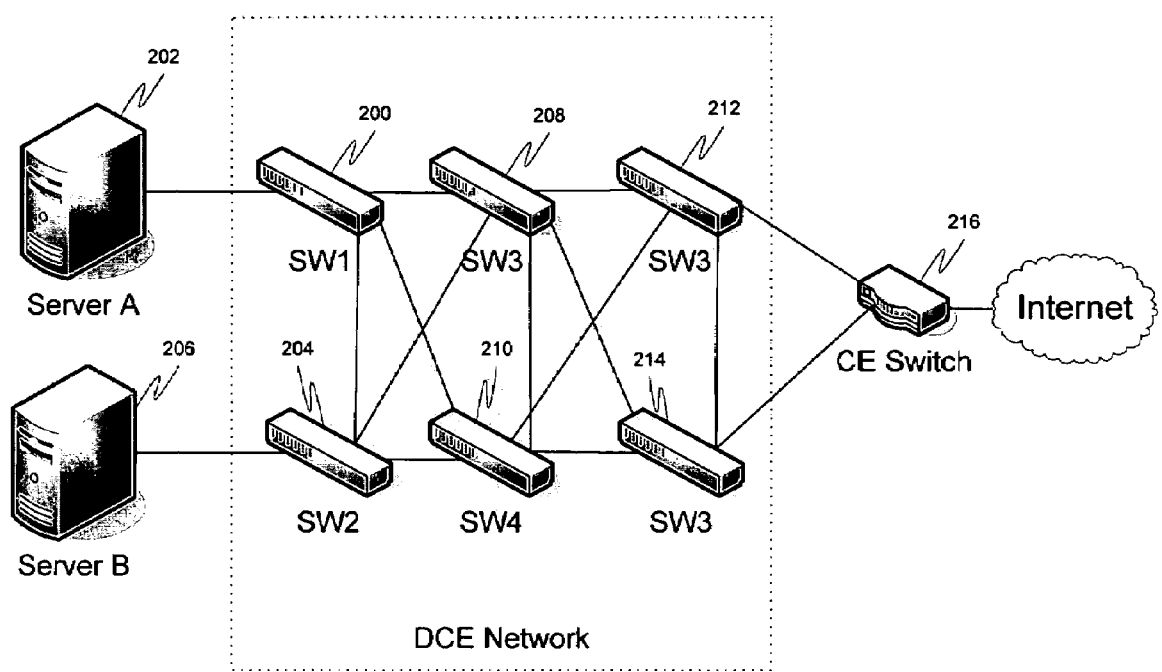
FIG. 2 illustrates a typical DCE network.
Figure 3:
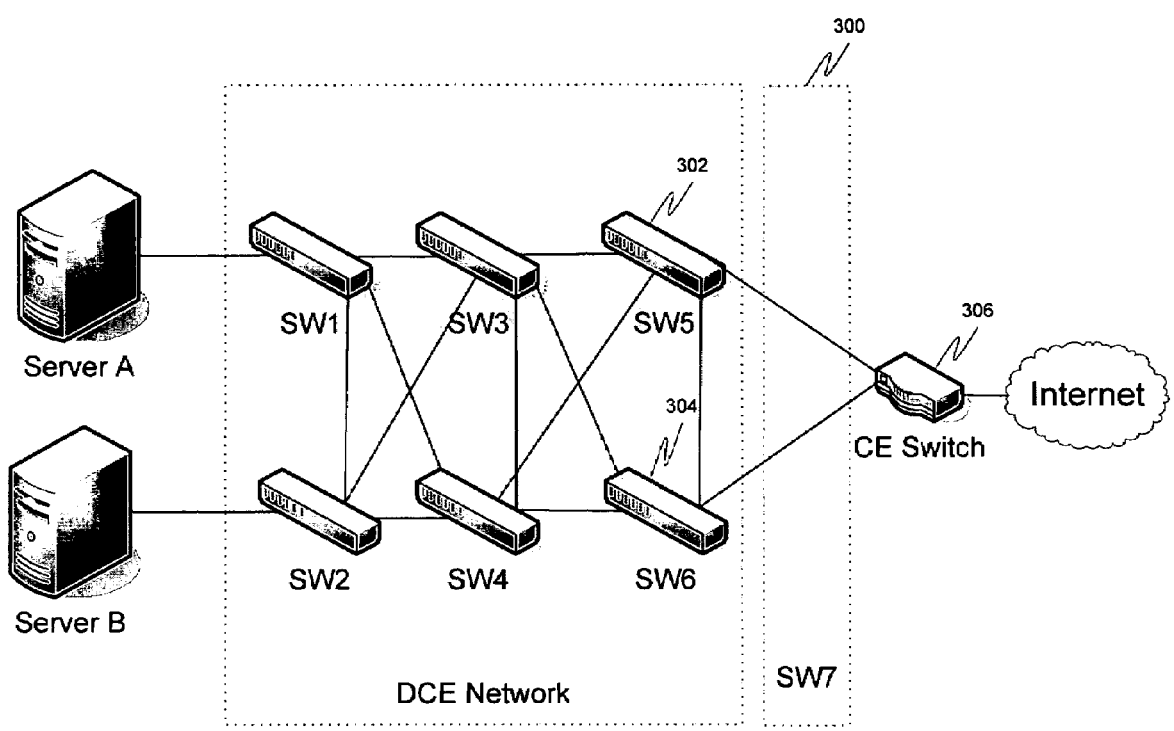
FIG. 3 illustrates an example network of layer 2 switches including an emulated switch.

A solution is provided wherein the interfaces between multiple chassis (e.g., edge switches) and non-DCE devices are treated as a single emulated switch. This emulated switch effectively enables 2 different views to the 2 different sides. FIG. 3 illustrates an example network of layer 2 switches including an emulated switch. Here, emulated switch 300 is viewed as being between edge switches 302, 304 and the CE device 306. It appears to be equidistant from each of the edge switches 302, 304. For the CE-side, it appears that the multiple links are actually a single port bundle (a single EtherChannel). Thus the CE switch/host would now use the multiple ports in a load-balanced fashion. For the DCE-side, it makes the multiple links appear as a single port of the emulated switch, which is physically connected to the multiple DCE switches that participate with the emulated switch. Thus, frames destined to any port of the emulated switch may take any of the links (through any of the physical DCE switches), thereby enabling effective load-balancing for frames traveling from DCE side into the CE switch/host.

DCE switches typically each have their own switch identifications and independently participate in DCE forwarding. In an embodiment of the present invention, the edge switches connected to the non-DCE device co-ordinate the emulated switch identification that is to be used to represent the multi-chassis etherchannels. In this embodiment, both physical switches may advertise their reachability to this emulated switch identification to the rest of the DCE network. The emulated switch is advertised as being equidistant from the edge switches. This allows the rest of the DCE network to build shortest path routes towards the emulated switch, which pass through one of the edge switches. Since the shortest path is determined based on physical proximity to the emulated switch, this effectively load balances between the edge switches connected to the emulated switch. This is in direct conflict with the prior art, which simply disabled one of the links, routing all traffic through only one of the edge switches, creating a potential bottleneck for the traffic.

In an embodiment of the present invention, broadcasts and/or multicasts originating from the DCE network would be allowed only through one port of this multi-chassis Etherchannel of the emulated switch. This requires coordination between the physical DCE switches. Similarly, broadcasts and/or multicasts originating from a non-DCE network could come into the DCE switches through any of the etherchannel ports. The decision as to which of the links to use may be based on some sort of load balancing algorithm. The goal would likely be to have traffic split evenly among the links. A Self-forwarding check on the Multi-Chassis EtherChannel ports may also compare the frame's hierarchical address with the port's hierarchical address. Therefore, even if the frame ingressing from one Multi-Chassis EtherChannel port tries to egress out of another Multi-Chassis EtherChannel ports (of the different physical switch), it can be dropped due to the self-forwarding check.

Unicast frames towards hosts belonging to the emulated switch could come to any of the edge switches connected to the emulated switch. In an embodiment of the present invention, each of these physical switches would use its local Multi-Chassis EtherChannel, i.e. locally attached ports that belong to Multi-Chassis EtherChannel, to deliver unicasts. If all of the Multi-Chassis EtherChannel ports on that switch are down, the frames may be sent to the peer switch over a link such as an Emulated Switch Link (ESL). The peer switch could then use its ports belonging to that Multi-Chassis EtherChannel to forward the frames.

Figure 4:
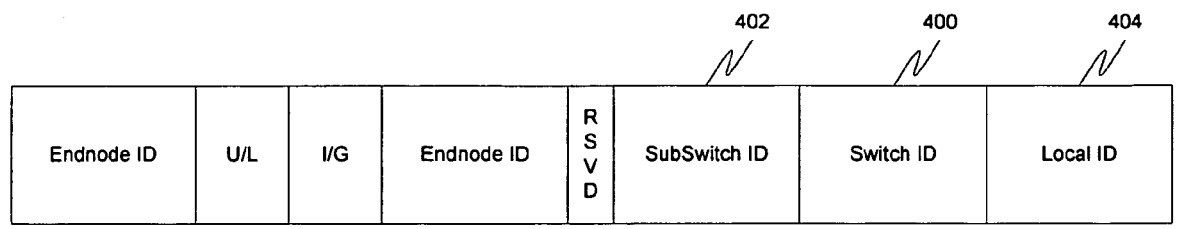
FIG. 4 illustrates a standard DCE hierarchical address format.

Addressing using the emulated switch may be accomplished using a consistent hierarchical address format. This format may be the standard DCE hierarchical address format. This format is depicted in FIG. 4. Here, switch ID 400 may be used to store the emulated switch identification. Then, either the subswitch ID field 402 or the local ID field 404 may be used for Multi-Chassis EtherChannel. In either case, the physical DCE switches connected to the emulated switch coordinate so that all ports of the same Multi-Chassis EtherChannel get the same hierarchical address. It should be noted that there could be multiple Multi-Chassis EtherChannels within a single emulated switch-each Multi-Chassis EtherChannel gets the same emulated switch ID.

An emulated switch link (ESL) between the edge switches may be used to enable learning across ports belonging to the Multi-Chassis EtherChannel, i.e. to synchronize the MAC table for ports belonging to the Multi-Chassis EtherChannel. The ESL link may also be used to carry data frames belonging to the Multi-Chassis EtherChannel ports during link failures, for exchanging emulated switch control plane messages between the physical switches (LACP protocol frames, MAC learning updates, co-ordination of switch-id, LIDs, etc.), or as a regular data link.

It should be noted that the processes described above need not be limited to DCE and non-DCE switch combinations. Technically, the DCE network may be any network of layer 2 switches, while the non-DCE devices may be any network of devices that uses a spanning tree or similar algorithm. For purposes of this document, the term "spanning tree device" will be used to refer to any device that uses a spanning tree or similar algorithm. In one embodiment, this device may be a CE device.

Figure 5:
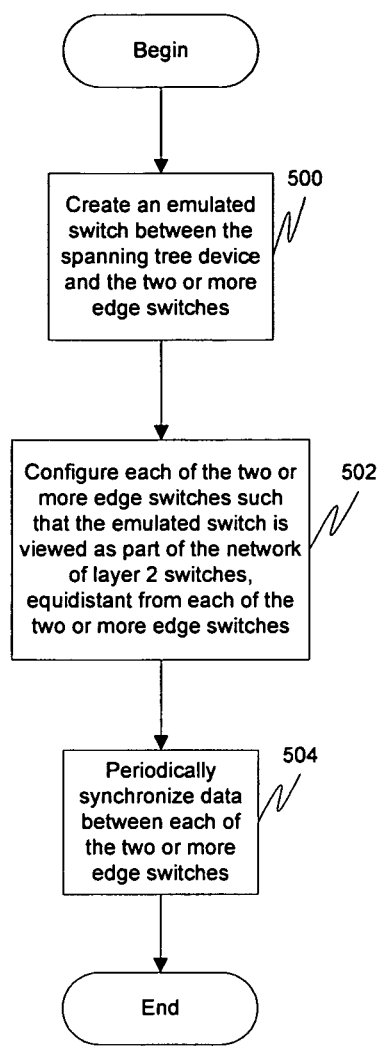
FIG. 5 illustrates an example method for configuring a system of devices including a spanning tree device connected to two or more edge switches in a network of layer 2 switches.

FIG. 5 illustrates an example method for configuring a system of devices including a spanning tree device connected to two or more edge switches in a network of layer 2 switches. The spanning tree device may be a Classic Ethernet switch and the network of layer 2 switches may be a DCE network. At 500, an emulated switch may be created between the spanning tree device and the two or more edge switches. At 502, each of the two or more edge switches may be configured such that the emulated switch is viewed as part of the network of layer 2 switches, equidistant from each of the two or more edge switches. This may include configuring each of the two or more edge switches to, upon receipt of a unicast frame from another device in the network of layer 2 switches, check to ensure the unicast frame is for the emulated switch, and if so, examine a subswitch or local identification within the unicast frame and forward the frame to the spanning tree device based upon the subswitch identification or local identification. The configuring may also include configuring each of the two or more edge switches to, upon receipt of a broadcast or multicast frame from another device in the network of layer 2 switches, coordinate with each of the other of the two or more edge switches to forward the multicast frame from only one of the edge switches. The particular one of the edge switches may be selected based on a load balancing algorithm. At 504, data may be periodically synchronized between each of the two or more edge switches. This data may include, for example, a MAC table. This synchronization may occur over an ESL link.

Figure 6:
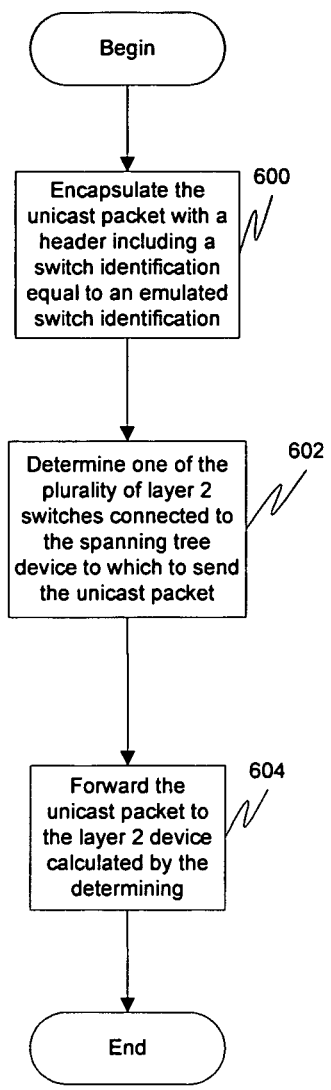
FIG. 6 illustrates an example method for forwarding a unicast frame from a device in a network of layer 2 switches to a spanning tree device via one of a plurality of layer 2 switches connected to the spanning tree device.

FIG. 6 illustrates an example method for forwarding a unicast frame from a device in a network of layer 2 switches to a spanning tree device via one of a plurality of layer 2 switches connected to the spanning tree device. The device may be a layer 2 switch. At 600, the unicast frame may be encapsulated with a header including a switch identification equal to an emulated switch identification. At 602, one of the plurality of layer 2 switches connected to the spanning tree device to which to send the unicast frame may be determined. This may be determined based on a shortest path algorithm where an emulated switch having the emulated switch identification is viewed as equidistant from each of the plurality of layer 2 switches connected to the spanning tree device. The shortest path algorithm may recognize links that are inactive or inoperative and determine the shortest path in light of this information. At 604, the unicast frame may be forwarded to the layer 2 device calculated by the determining.

Figure 7:
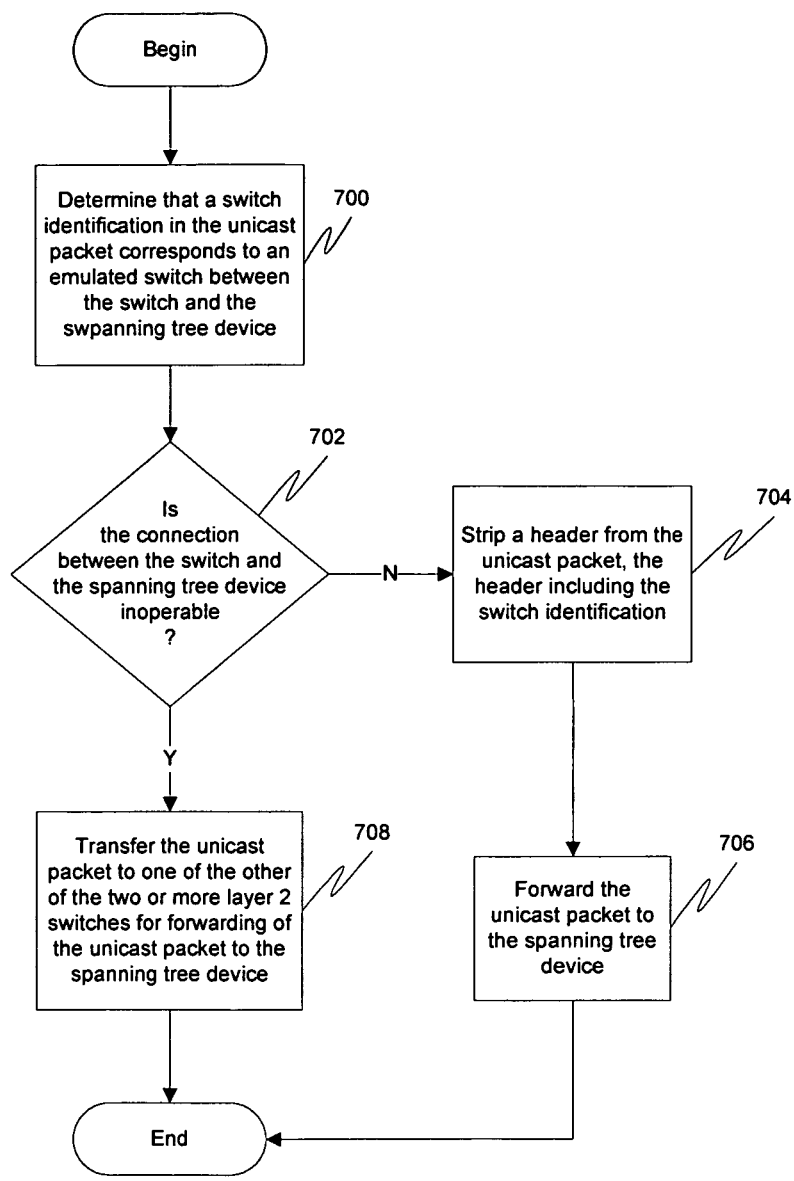
FIG. 7 illustrates an example method for handling a unicast frame received at a switch in a network of layer 2 switches from another switch in the network of layer 2 switches.

FIG. 7 illustrates an example method for handling a unicast frame received at a switch in a network of layer 2 switches from another switch in the network of layer 2 switches. The unicast frame is destined for a spanning tree device, wherein the spanning tree device is connected to two or more of the switches in the network of layer 2 switches. At 700, it may be determined that a switch identification in the unicast frame corresponds to an emulated switch between the switch and the spanning tree device. At 702, it may be determined if the connection between the switch the spanning tree device is inoperable. If not, then at 704, a header may be stripped from the unicast frame, the header including the switch identification. Then at 706, the unicast frame may be forwarded to the spanning tree device. The forwarding may include forwarding the unicast frame based on either the subswitch identification or the local identification in the header. If the connection is inoperable, then at 708, the unicast frame may be transferred to one of the other of the two or more layer 2 switches for forwarding of the unicast frame to the spanning tree device. This transferring may occur, for example, via an ESL link.

Figure 8:
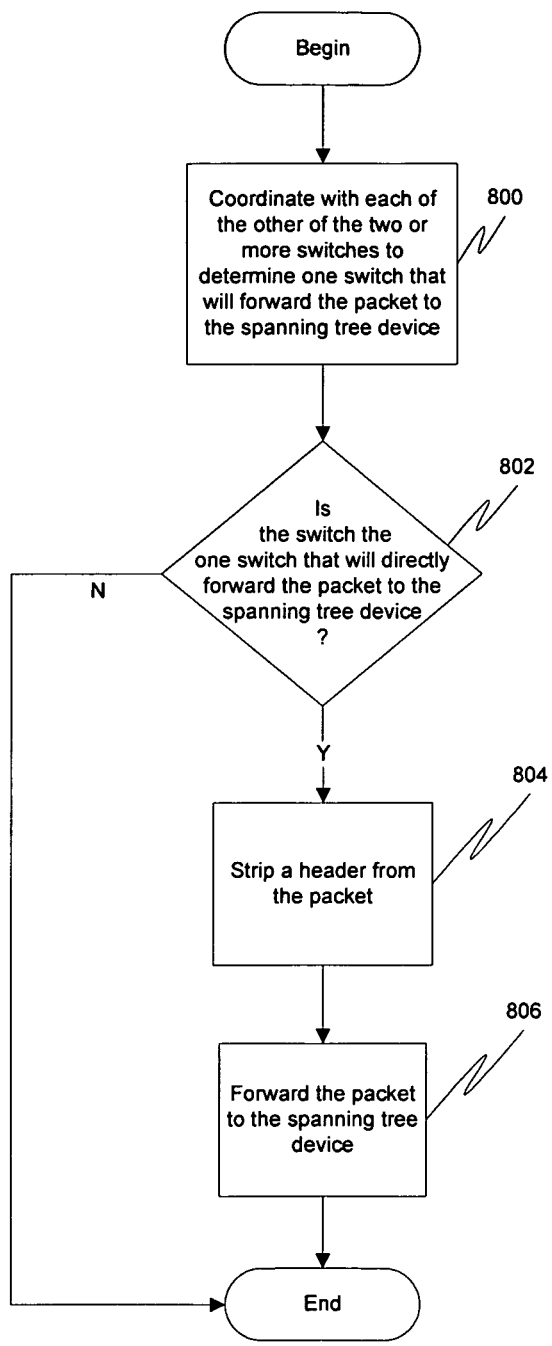
FIG. 8 illustrates an example method for handling a multicast or broadcast frame received at a switch in a network of layer 2 switches from another switch in the network of layer 2 switches.

FIG. 8 illustrates an example method for handling a multicast or broadcast frame received at a switch in a network of layer 2 switches from another switch in the network of layer 2 switches. At 800, the switch may coordinate with each of the other of the two or more switches to determine one switch that will directly forward the frame to the spanning tree device. This coordinating may occur via, for example, an ESL link. At 802, it may be determined if the switch is the one switch that will directly forward the frame to the spanning tree device. If so, then at 804, a header may be stripped from the frame. At 806, the frame may be forwarded to the spanning tree device.

Figure 9:
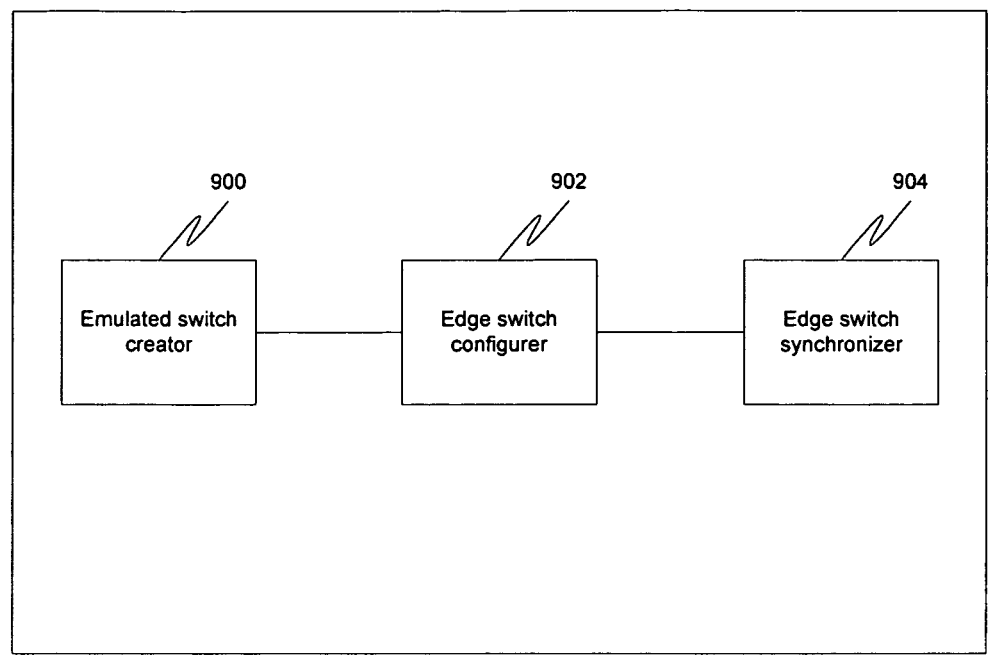
FIG. 9 illustrates an example apparatus for configuring a system of devices including a spanning tree device connected to two or more edge switches in a network of layer 2 switches.

FIG. 9 illustrates an example apparatus for configuring a system of devices including a spanning tree device connected to two or more edge switches in a network of layer 2 switches. The spanning tree device may be a Classic Ethernet switch and the network of layer 2 switches may be a DCE network. An emulated switch creator 900 may create an emulated switch between the spanning tree device and the two or more edge switches. An edge switch configurer 902 coupled to the emulated switch creator 900 may configure each of the two or more edge switches such that the emulated switch is viewed as part of the network of layer 2 switches, equidistant from each of the two or more edge switches. This may include configuring each of the two or more edge switches to, upon receipt of a unicast frame from another device in the network of layer 2 switches, check to ensure the unicast frame is for the emulated switch, and if so, examine a subswitch or local identification within the unicast frame and forward the frame to the spanning tree device based upon the subswitch identification or local identification. The configuring may also include configuring each of the two or more edge switches to, upon receipt of a broadcast or multicast frame from another device in the network of layer 2 switches, coordinate with each of the other of the two or more edge switches to forward the multicast frame from only one of the edge switches. The particular one of the edge switches may be selected based on a load balancing algorithm. An edge switch synchronizer 904 coupled to the edge switch configurer 902 may periodically synchronize data between each of the two or more edge switches. This synchronization may occur over an ESL link.

Figure 10:
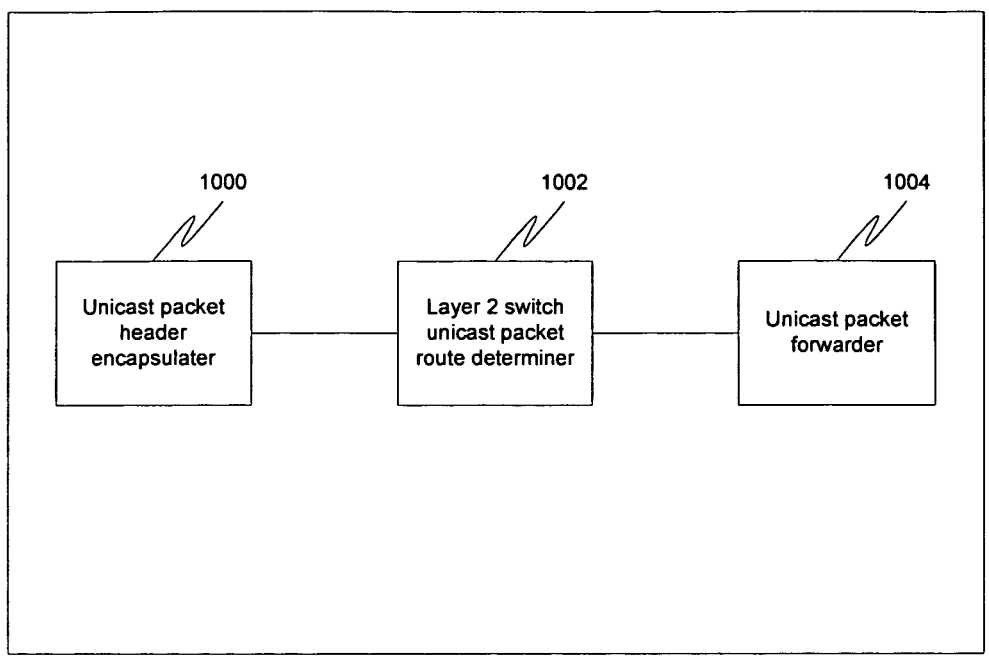
FIG. 10 illustrates an example apparatus for forwarding a unicast frame from a device in a network of layer 2 switches to a spanning tree device via one of a plurality of layer 2 switches connected to the spanning tree device.

FIG. 10 illustrates an example apparatus for forwarding a unicast frame from a device in a network of layer 2 switches to a spanning tree device via one of a plurality of layer 2 switches connected to the spanning tree device. The device may be a layer 2 switch. A unicast frame header encapsulater 1000 may encapsulate the unicast frame with a header including a switch identification equal to an emulated switch identification. A layer 2 switch unicast frame route determiner 1002 coupled to the unicast frame header encapsulater 1000 may determine one of the of the plurality of layer 2 switches connected to the spanning tree device to which to send the unicast frame. This may be determined based on a shortest path algorithm where an emulated switch having the emulated switch identification is viewed as equidistant from each of the plurality of layer 2 switches connected to the spanning tree device. The shortest path algorithm may recognize links that are inactive or inoperative and determine the shortest path in light of this information. A unicast frame forwarder 1004 coupled to the layer 2 switch unicast frame route determiner 1002 may forward the unicast frame to the layer 2 device calculated by the determining.

Figure 11:
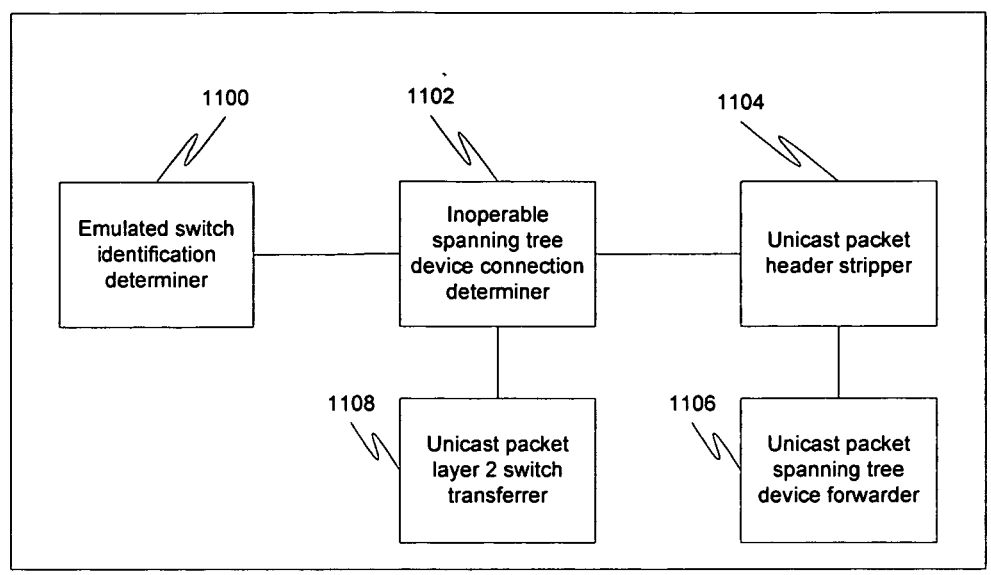
FIG. 11 illustrates an example apparatus for handling a unicast frame received at a switch in a network of layer 2 switches from another switch in the network of layer 2 switches.

FIG. 11 illustrates an example apparatus for handling a unicast frame received at a switch in a network of layer 2 switches from another switch in the network of layer 2 switches. The unicast frame may be destined for spanning tree device, wherein the spanning tree device is connected to two or more of the switches in the network of layer 2 switches. An emulated switch identification determiner 1100 may determine that a switch identification in the unicast frame corresponds to an emulated switch between the switch and the spanning tree device. A unicast frame header stripper 1102 coupled to the emulated switch identification determiner 1100 may strip a header from the unicast frame, the header including the switch identification. An inoperable spanning tree device connection determiner 1104 coupled to the unicast frame header stripper 1102 may determine if the connection between the switch the spanning tree device is inoperable. If not, then at a unicast frame spanning tree device forwarder 1106 coupled to the inoperable spanning tree device connection determiner 1104 may forward the unicast frame to the spanning tree device. The forwarding may include forwarding the unicast frame based on either the subswitch identification or the local identification in the header. If the connection is inoperable, then a unicast frame layer 2 switch transferrer 1108 coupled to the inoperable spanning tree device connection determiner 104 may transfer the unicast frame may be transferred to one of the other of the two or more layer 2 switches for forwarding of the unicast frame to the spanning tree device. This transferring may occur, for example, via an ESL link.

Figure 12:
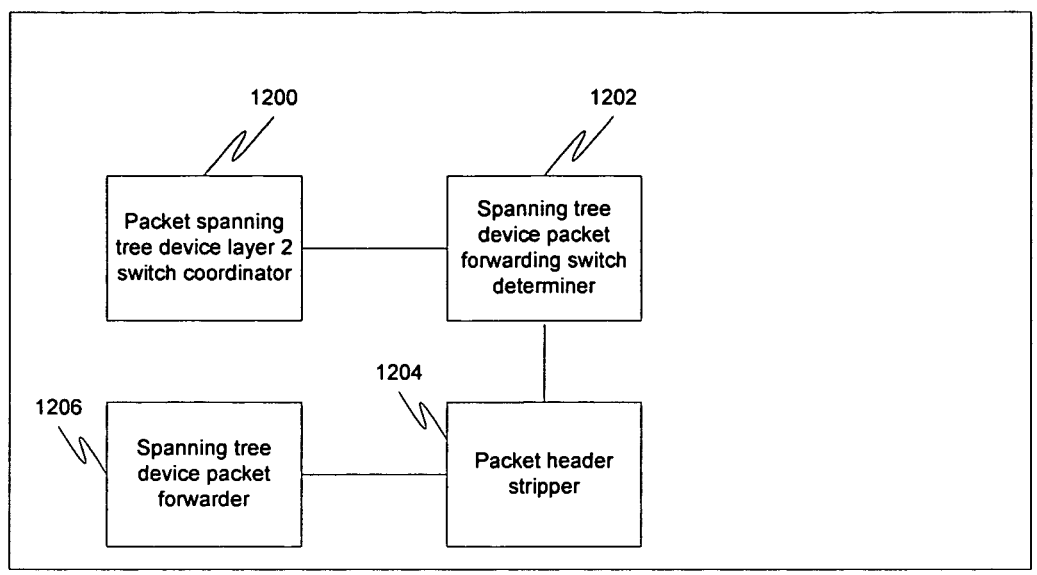
FIG. 12 illustrates an example apparatus for handling a multicast or broadcast frame received at a switch in a network of layer 2 switches from another switch in the network of layer 2 switches.

FIG. 12 illustrates an example apparatus for handling a multicast or broadcast frame received at a switch in a network of layer 2 switches from another switch in the network of layer 2 switches. The frame may be destined for spanning tree device, wherein the spanning tree device is connected to two or more of the switch in the network of layer 2 switches. A frame spanning tree device layer 2 switch coordinator 1200 may coordinate with each of the other of the two or more switches to determine one switch that will directly forward the frame to the spanning tree device. This coordinating may occur via, for example, an ESL link. A spanning tree frame forwarding switch determiner 1202 coupled to the frame spanning tree device layer 2 switch coordinator 1200 may determine if the switch is the one switch that will directly forward the frame to the spanning tree device. If so, then a frame header stripper 1204 coupled to the spanning tree forwarding switch determiner 1202 may strip a header from the frame. A spanning tree device frame forwarder 1206 coupled to the frame header stripper 1204 may forward the frame to the spanning tree device.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method for configuring a system of devices including a spanning tree device connected to two or more edge switches in a network of layer 2 switches, the method comprising:
    creating an emulated switch between the spanning tree device and the two or more edge switches, wherein a first link connects the spanning tree device to a first edge switch among the two or more edge switches and a second link connects the spanning tree device to a second edge switch among the two or more edge switches, the emulated switch appearing to be connected to the first link between the first edge switch and the spanning tree device, the emulated switch further appearing to be connected to the second link between the second edge switch and the spanning tree device, links to the emulated switch appearing as a single port of the emulated switch to the network of layer 2 switches;
    configuring each of the two or more edge switches such that the emulated switch is viewed as equidistant from each of the two or more edge switches and as part of the network of layer 2 switches; and
    if the first link between the first edge switch and the spanning tree device is inoperable, transferring a frame received at the first edge switch to the second edge switch for forwarding of the frame to the spanning tree device, stripping a header from the frame, the header including a switch identification corresponding to the emulated switch, and forwarding the frame from the second edge switch to the spanning tree device based, at least in part, upon a subswitch or local identification within the header of the frame;
    wherein the configuring includes configuring each of the two or more edge switches to, upon receipt of a unicast frame from another switch in the network of layer 2 switches, determine if the unicast frame is for the emulated switch, and if so, examine the subswitch or local identification within the header of the unicast frame and forward the unicast frame to the spanning tree device based, at least in part, upon the subswitch or local identification.

2. The method of claim 1, wherein said network of layer 2 switches is a Data Center Ethernet (DCE) network.

3. The method of claim 1, wherein said spanning tree device is a Classic Ethernet (CE) device.

4. The method of claim 1, further comprising:
    periodically synchronizing data between each of the two or more edge switches.

5. The method of claim 4, wherein the data includes media access control (MAC) tables.

6. The method of claim 4, wherein said periodically synchronizing occurs over an ESL link.

7. The method of claim 1, wherein said configuring includes configuring each of the two or more edge switches to perform a self-forwarding check to ensure that a frame received from one port of the emulated switch is not forwarded to another port of the emulated switch.

8. The method of claim 1, wherein said configuring includes configuring each of the two or more edge switches to, upon receipt of a unicast frame from another switch in the network of layer 2 switches, determine if the unicast frame is for the emulated switch, and if so, examine a subswitch identification within the unicast frame and forward the unicast frame to the spanning tree device based upon the subswitch identification.

9. The method of claim 1, wherein said configuring includes configuring each of the two or more edge switches to, upon receipt of a unicast frame from another switch in the network of layer 2 switches, determine if the unicast frame is for the emulated switch, and if so, examine a local identification within the unicast frame and forward the unicast frame to the spanning tree device based upon the local identification.

10. The method of claim 1, wherein said configuring includes configuring each of the two or more edge switches to, upon receipt of a broadcast or multicast frame from another switch in the network of layer 2 switches, coordinate with each of the other of the two or more edge switches to forward the multicast frame from only one of the edge switches.

11. The method of claim 10, wherein said one of the edge switches is selected based on a load balancing algorithm.

12. A method for forwarding a unicast frame from a switch in a network of layer 2 switches to a spanning tree device via one of a plurality of layer 2 switches connected to the spanning tree device, the method comprising:
    encapsulating the unicast frame with a header including a switch identification equal to an emulated switch identification;
    determining a first edge switch in two or more edge switches of the plurality of layer 2 switches connected to the spanning tree device to which to send the unicast frame based on a shortest path algorithm where an emulated switch having the emulated switch identification is viewed as equidistant from each of the plurality of layer 2 switches connected to the spanning tree device, wherein a first link connects the spanning tree device to the first edge switch in the plurality of layer 2 switches and a second link connects the spanning tree device to a second edge switch in the two or more edge switches of the plurality of layer 2 switches, the emulated switch appearing to be connected to the first link between the first edge switch and the spanning tree device, the emulated switch further appearing to be connected to the second link between the second edge switch and the spanning tree device, links to the emulated switch appearing as a single port of the emulated switch to the network of layer 2 switches;
    forwarding the unicast frame to the first edge switch calculated by said determining;
    configuring each of the two or more edge switches such that the emulated switch is viewed as equidistant from each of the two or more edge switches and as part of the network of layer 2 switches; and if the first link between the first edge switch and the spanning tree device is inoperable, transferring the unicast frame from the first edge switch to the second edge switch for forwarding of the unicast frame to the spanning tree device, stripping the header from the unicast frame, and forwarding the unicast frame from the second edge switch to the spanning tree device based, at least in part, upon a subswitch or local identification within the header of the unicast frame;

wherein the configuring includes configuring each of the two or more edge switches to, upon receipt of a unicast frame from another switch in the network of layer 2 switches, determine if the frame is for the emulated switch, and if so, examine the subswitch or local identification within the header of the frame and forward the frame to the spanning tree device based, at least in part, upon the subswitch or local identification.

13. The method of claim 12, wherein the switch is a Data Center Ethernet (DCE) switch.

14. The method of claim 12, wherein the shortest path algorithm recognizes links that are inactive or inoperative and determines the shortest path in light of this information.

15. A method for handling a unicast frame received at a switch in a network of layer 2 switches from another switch in the network of layer 2 switches, the unicast frame destined for a spanning tree device, wherein said spanning tree device is connected to two or more of the switches in the network of layer 2 switches, the method comprising:

determining that a switch identification in the unicast frame corresponds to an emulated switch between the switch and the spanning tree device, wherein a first link connects the spanning tree device to a first edge switch among the two or more layer 2 switches and a second link connects the spanning tree device to a second edge switch among the two or more layer 2 switches, the emulated switch appearing to be connected to the first link between the first edge switch and the spanning tree device, the emulated switch further appearing to be connected to the second link between the second edge switch and the spanning tree device, links to the emulated switch appearing as a single port of the emulated switch to the network of layer 2 switches;

configuring each of the two or more layer 2 switches such that the emulated switch is viewed as equidistant from each of the two or more switches and as part of the network of layer 2 switches; and if the first link between the first edge switch and the spanning tree device is inoperable, transferring the unicast frame from the first edge switch to the second edge switch for forwarding of the unicast frame to the spanning tree device;

stripping a header from the unicast frame, the header including the switch identification; and forwarding the unicast frame from the second edge switch to the spanning tree device based, at least in part, upon a subswitch or local identification within the header of the unicast frame;

wherein the configuring includes configuring each of the two or more layer 2 switches to, upon receipt of a unicast frame from another switch in the network of layer 2 switches, determine if the unicast frame is for the emulated switch, and if so, examine the subswitch or local identification within the header of the unicast frame and forward the unicast frame to the spanning tree device based, at least in part, upon the subswitch or local identification.

16. The method of claim 15, wherein said forwarding includes forwarding the unicast frame based on a subswitch identification in the header.

17. The method of claim 15, wherein said forwarding includes forwarding the unicast frame based on a local identification in the header.

18. The method of claim 15, wherein said transferring occurs via an ESL link.

19. A method for handling a multicast or broadcast frame received at a switch in a network of layer 2 switches from another switch in the network of layer 2 switches, the frame destined for a spanning tree device, wherein said spanning tree device is connected to two or more of the switches in the network of layer 2 switches, the method comprising:

coordinating with each of the other of said two or more switches to determine one switch that will forward the frame to the spanning tree device, each switch in the two or more switches connected to the spanning tree device via a plurality of links, each link in the plurality connecting the spanning tree device to one of the two or more switches, wherein an emulated switch appears to be connected to each link in the plurality between the spanning tree device and the switch corresponding to that link, links to the emulated switch appearing as a single port of the emulated switch to the network of layer 2 switches;

configuring each of the two or more switches such that the emulated switch is viewed as equidistant from each of the two or more switches and as part of the network of layer 2 switches; and if the switch is the one switch that will directly forward the frame to the spanning tree device, determining that the link between the switch and the spanning tree device is inoperable;

transferring the frame from the switch to the second edge switch for forwarding of the frame to the spanning tree device;

stripping a header from the frame, the header including a switch identification corresponding to the emulated switch,; and forwarding the frame from the second switch to the spanning tree device based, at least in part, upon a subswitch or local identification within the header of the frame:

wherein the configuring includes configuring each of the two or more edge switches to, upon receipt of a unicast frame from another switch in the network of layer 2 switches, determine if the unicast frame is for the emulated switch, and if so, examine the subswitch or local identification within the header of the unicast frame and forward the unicast frame to the spanning tree device based, at least in part, upon the subswitch or local identification.

20. The method of claim 19, wherein said coordinating occurs via an ESL link.

21. A system, comprising:

means for creating an emulated switch between a spanning tree device and two or more edge switches in a network of layer 2 switches, wherein a first link connects the spanning tree device to a first edge switch among the two or more edge switches and a second link connects the spanning tree device to a second edge switch among the two or more edge switches, the emulated switch appearing to be connected to the first link between the first edge switch and the spanning tree device, the emulated switch further appearing to be connected to the second link between the second edge switch and the spanning tree device, links to the emulated switch appearing as a single port of the emulated switch to the network of layer 2 switches; and means for configuring each of the two or more edge switches such that the emulated switch is viewed as equidistant from each of the two or more edge switches and as part of the network of layer 2 switches;

means for determining that the first link between the first edge switch and the spanning tree device is inoperable;

means for transferring a frame from the first edge switch to the second edge switch for forwarding of the unicast frame to the spanning tree device as a result of the determining; and means for stripping a header from the frame, the header including a switch identification corresponding to the emulated switch;

means for forwarding the frame from the second edge switch to the spanning tree device based, at least in part, upon a subswitch or local identification within the header of the frame;

wherein the configuring includes configuring each of the two or more edge switches to, upon receipt of a unicast frame from another switch in the network of layer 2 switches, determine if the unicast frame is for the emulated switch, and if so, examine the subswitch or local identification within the header of the unicast frame and forward the unicast frame to the spanning tree device based, at least in part, upon the subswitch or local identification.

* * * * *